US012584580B2

(12) United States Patent
    Tseng et al.

(10) Patent No.: US 12,584,580 B2
(45) Date of Patent: Mar. 24, 2026

(54) FLOATING ADAPTER MODULE

(71) Applicant: HANWIT PRECISION INDUSTRIES LTD., New Taipei (TW)

(72) Inventors: Ying-Chih Tseng, New Taipei (TW); Ming-De Wu, New Taipei (TW); Ching-Kai Chang, New Taipei (TW)

(73) Assignee: HANWIT PRECISION INDUSTRIES LTD., New Taipei City (TW)

( * ) Notice: Subject to any disclaimer, the term of this patent is extended or adjusted under 35 U.S.C. 154(b) by 0 days.

(21) Appl. No.: 18/784,236

(22) Filed: Jul. 25, 2024

(65) Prior Publication Data

US 2025/0224062 A1 Jul. 10, 2025

(30) Foreign Application Priority Data

Jan. 5, 2024 (TW) ................................ 113100608

(51) Int. Cl.
    F16L 39/04 (2006.01)

(52) U.S. Cl.
    CPC .................................... F16L 39/04 (2013.01)

(58) Field of Classification Search
    CPC ....... F16L 27/00; F16L 27/08; F16L 27/0824; F16L 27/10; F16L 27/1008; F16L 27/1021; F16L 27/12; F16L 27/125; F16L 33/225; F16L 39/04; F16L 41/005; F16L 41/007; F16L 49/08
    See application file for complete search history.

(56) References Cited

U.S. PATENT DOCUMENTS

| 1,489,277 | A | * | 4/1924 | Rains | F16L 39/04 |
| | | | | | 285/94 |
| 2,175,752 | A | * | 10/1939 | Gray | F16L 27/00 |
| | | | | | 285/94 |
| 3,446,245 | A | * | 5/1969 | Snyder, Jr. | F16L 27/0824 |
| | | | | | 285/276 |
| 4,254,972 | A | * | 3/1981 | Wiedenbeck | F16L 39/04 |
| | | | | | 285/422 |
| 2010/0132178 | A1 | * | 6/2010 | Chiu | F16L 39/04 |
| | | | | | 29/281.5 |

(Continued)

FOREIGN PATENT DOCUMENTS

| EP | 1632705 A1 | * | 3/2006 | ......... F16L 27/0824 |
| GB | 2297000 A | * | 7/1996 | ............. F16L 27/08 |

(Continued)

*Primary Examiner* — Matthew Troutman
*Assistant Examiner* — Fannie Kee
(74) *Attorney, Agent, or Firm* — MUNCY, GEISSLER, OLDS & LOWE, P.C.

(57) ABSTRACT

A floating adapter module includes a base having two connecting portions, a receiving groove and a shaft mounted with a limiter, two docking parts respectively assembled at the connecting portions, the first and second elastic members respectively assembled at the receiving groove and the shaft, and a housing assembled and positioned in the receiving space of the base. The first elastic member is used to provide the base with horizontal and vertical (X, Y) radial floating in the receiving space. At the same time, the second elastic member is used to provide the base with axial (Z) floating in the receiving space. This achieves the purpose of floating displacement of the base located inside the housing.

9 Claims, 8 Drawing Sheets

(56)  References Cited

U.S. PATENT DOCUMENTS

| 2010/0232908 A1* | 9/2010 | Chiu | F16L 39/04 |
| | | | 411/554 |
| 2012/0099943 A1* | 4/2012 | Chiu | F16L 39/04 |
| | | | 411/347 |
| 2012/0195711 A1* | 8/2012 | Chiu | F16L 39/04 |
| | | | 411/103 |
| 2013/0170895 A1* | 7/2013 | Tseng | F16L 39/04 |
| | | | 403/270 |
| 2013/0294863 A1* | 11/2013 | Tseng | F16L 39/04 |
| | | | 411/175 |
| 2014/0105707 A1* | 4/2014 | Tseng | F16L 39/04 |
| | | | 411/508 |
| 2015/0071730 A1* | 3/2015 | Tseng | F16L 39/04 |
| | | | 411/318 |
| 2015/0362102 A1* | 12/2015 | Pearl, II | F16L 39/04 |
| | | | 285/390 |
| 2023/0143344 A1* | 5/2023 | Marquis | F16L 39/04 |
| | | | 285/261 |
| 2024/0077160 A1* | 3/2024 | Zhang | F16L 39/04 |

FOREIGN PATENT DOCUMENTS

| KR | 200325938 Y1 * | 9/2003 | F16L 27/08 |
| TW | I866775 B * | 12/2024 | F16L 27/12 |
| WO | WO-0136857 A2 * | 5/2001 | F16L 27/125 |

* cited by examiner

FLOATING ADAPTER MODULE

This application claims the priority benefit of Taiwan patent application number 113100608, filed on Jan. 5, 2024.

BACKGROUND OF THE INVENTION

1. Field of the Invention

The present invention provides a floating adapter module, in particular, an adapter module capable of adjusting floating displacement in multiple directions such as axial and radial directions, which has two docking parts respectively assembled on two opposite connecting portions of a base, and has a first elastic member and a second elastic member assembled on the outside of the base so that the base can be assembled in the receiving space of the housing to achieve the purpose of directional floating adjustment.

2. Description of the Related Art

According to the current electronic devices, when the case, circuit board or panels (board to board) are assembled, they are locked with a set screw with a knob, a ring and a screw. The screw and the ring can be fixed on the first panel, then turn the knob to lock the screw into the second panel to form a preset position, and use a hand tool to tighten the screw to lock the first panel and the second panel into one piece. It can be used for board-to-board connection in equipment composed of multiple devices and mechanisms, such as telecommunications cabinets, industrial computers, and machine tools.

When various electronic devices are put into use, they will generate heat. Therefore, how to assist in heat dissipation so that various electronic devices can operate normally is also an important issue in the design and application of various electronic devices. Currently, water-cooling systems are commonly used in various electronic devices to assist in heat dissipation. The water cooling device (water circulation structure) of the water-cooling system is installed at the heat source of various electronic devices, such as central processing unit (CPU), chip, microprocessor chip or interface card, etc., then water pipes are connected to the external cold water circulation device (such as water tank, pumping motor, etc.) so that the water-cooling system can form a heat dissipation effect on the heat source through the cold water circulation. However, the connectors currently installed at the water cooling device are used to connect and assemble with the connectors at the water pipes to circulate the cold water in the water pipes into the water cooling device. However, the connectors of the water cooling device are directly fixed on the case, circuit board or panel of various electronic devices and cannot be adjusted or moved. Therefore, the water pipes must be aligned accurately when assembled without any deviation or skew. If the water pipes are slightly longer or shorter, or if there are other components around the heat source that limit or block the assembly of the water cooling device and the water pipes, it will cause inconvenience and trouble in the assembly process. After assembly, it is also easy to cause damage or failure of the connection position.

Therefore, how to solve the current assembly and alignment problems and troubles when assembling the water-cooling system in the case or heat source of the electronic device during connection, and the troubles and defects such as damage or failure caused by improper assembly, which is the direction that the relevant manufacturers engaged in this industry are eager to study and improve.

SUMMARY OF THE INVENTION

Therefore, in view of the above-mentioned problems and deficiencies, the inventor collected relevant information, and after multiple evaluations and considerations, he designed the invention of this floating adapter module.

The main object of the present invention is that the floating adapter module has two connecting portions respectively provided on two sides of a base, adjacent receiving groove and shaft provided on the outside of the base, a limiter assembled on the other side of the shaft, and two docking parts respectively assembled on the both sides of the connecting portions, and then a first elastic member is assembled at the receiving groove and a second elastic member is assembled at the shaft. The base can then be assembled and positioned inside the receiving space of the housing. A through hole with a reduced diameter is provided on one side of the receiving space, and an inner shoulder is formed at an adjacent position for one side of the second elastic member to abut against the inner shoulder. The outer side surface of the through hole is for the limiter at the shaft to abut against. The first elastic member is used to provide the base with horizontal and vertical (X, Y) radial floating in the receiving space. At the same time, the second elastic member is used to provide the base with axial (Z) floating in the receiving space. This achieves the purpose of floating adjustment displacement of the base inside the receiving space. It has flexible adjustable displacement space and can be easily assembled with external preset connection components.

Another object of the present invention is to provide a through channel inside the base, a first connecting portion and a second connecting portion of the connecting portions on both sides of the channel, and the first connecting portion and the second connecting portion on both sides of the channel are respectively used for assembling the first docking part and the second docking part. The first docking part is provided with a first docking side assembled at the first connecting portion. The second docking part is provided with a second docking side assembled at the second connecting portion. The first connecting portion and the second connecting portion of the base and the first docking side and the second docking side of the docking parts are respectively and selectively a screw hole and a screw rod, a quick jack and a quick connector, or a shaft hole and a shaft for relative assembly of the structure. The base further comprises a protruding spacer ring with a larger outer diameter provided between the receiving groove and the shaft. The outer diameter of the protruding spacer ring can be larger than the outer diameter of the receiving groove and the shaft. The limiter assembled on one side of the shaft can be a C-shaped buckle, a gasket or a latch. The two docking parts can be quick connectors, quick jacks, male plug connectors, female socket connectors, or water pipe connectors, etc.

Still another object of the present invention is that the first elastic member of the floating unit can be a reed. The reed defines an assembly hole therein to be assembled and sleeved on the receiving groove of the base. The reed can be in the shape of a ring wave, a ring cloud, a ring tooth, a ring regular or irregular shape, a ring concave and convex shape, or a curved pad. The reed of the first elastic member can be a radial horizontal (X-axis) direction to form a deformation adjustment space of ±1.5 mm or a vertical (Y-axis) direction to form a deformation adjustment space of ±2.0 mm. The second elastic member of the floating unit is a flat rectangular sheet-shaped spring wound in a wavy manner into a ring shape. The second elastic member can form an axial deformation adjustment space of ±2.50 mm, and can form a unidirectional compression displacement deformation adjustment of −4 mm during assembly. The second elastic member can be assembled and sleeved onto the shaft of the base by using the inner fitting hole thereof.

DETAILED DESCRIPTION OF THE
PREFERRED EMBODIMENT

In order to achieve the above objects and effects, the technical means and structures adopted by the present invention are described in detail below by way of a preferred embodiment accompanying with the annexed drawings so as to facilitate a complete understanding.

Figure 1:
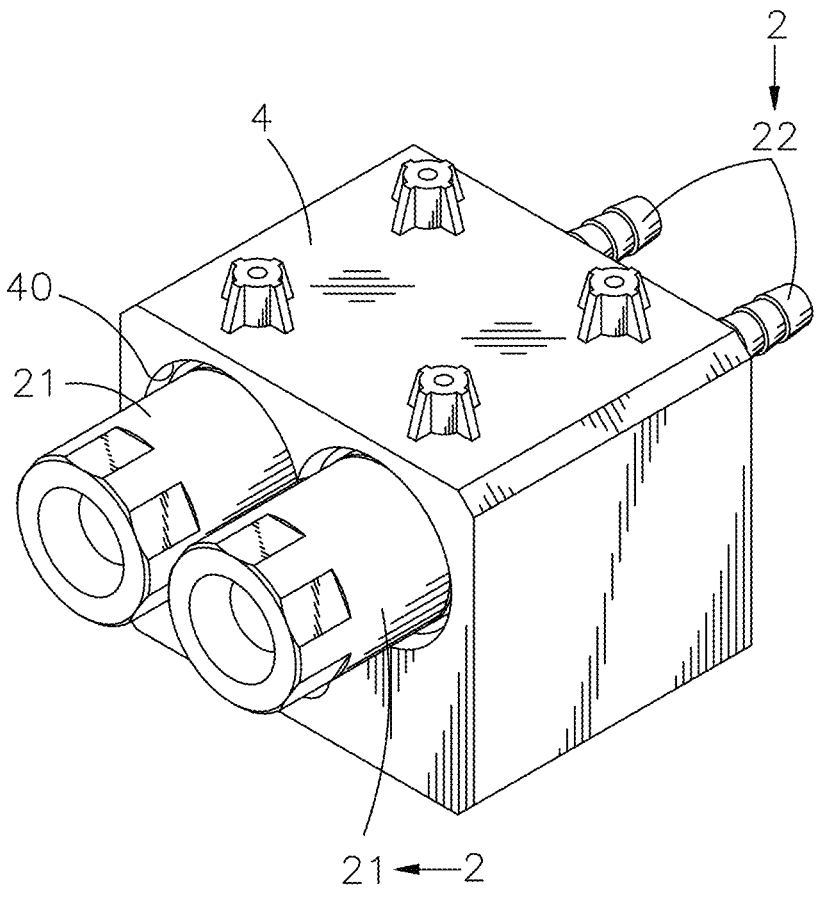
FIG. 1 is a three-dimensional external view of the present invention.
Figure 2:
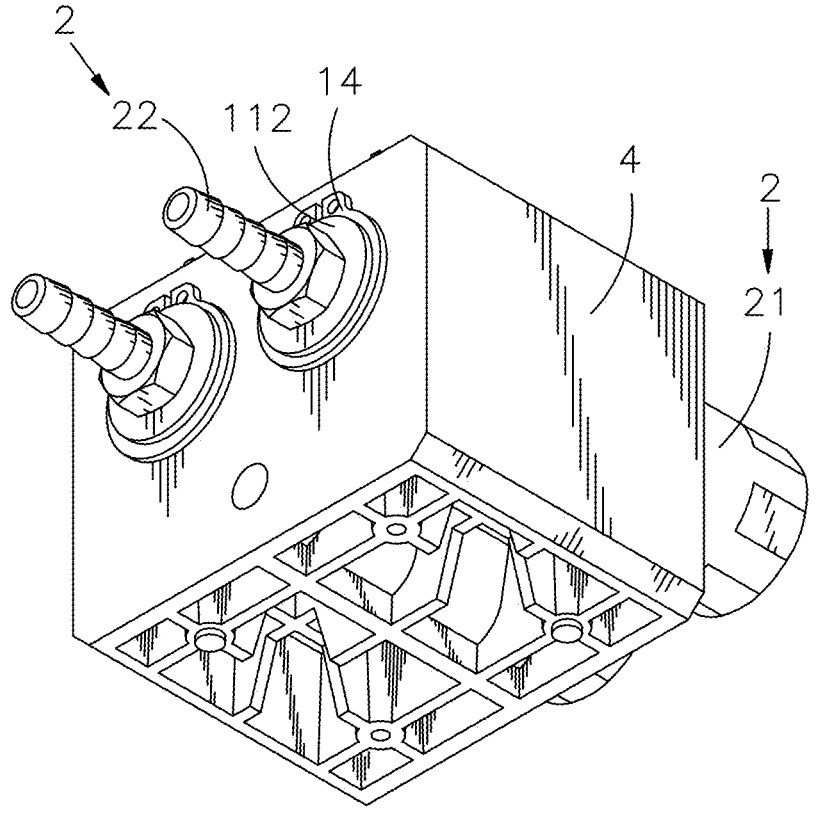
FIG. 2 is a three-dimensional external view of the present invention from another viewing angle.
Figure 3:
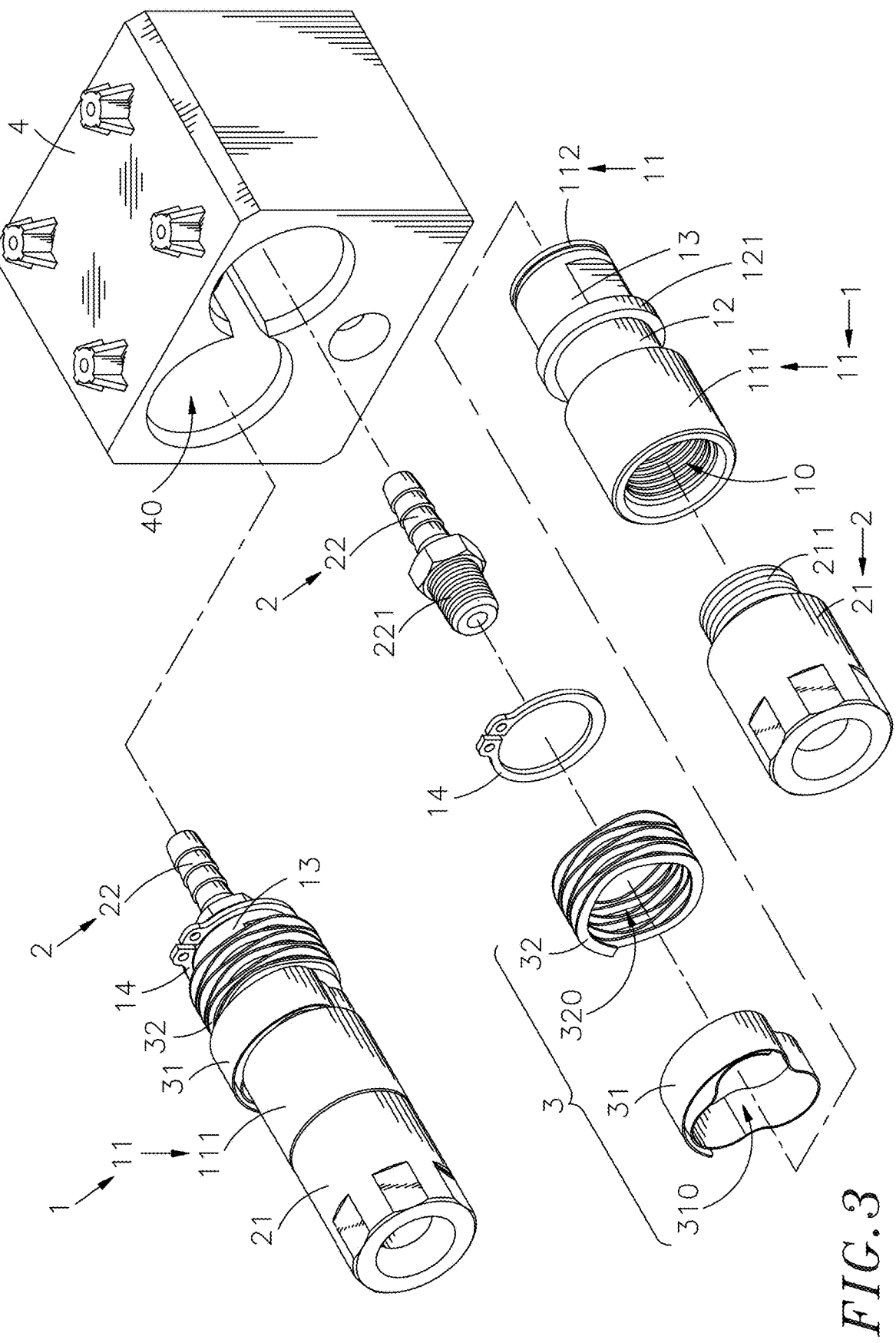
FIG. 3 is a three-dimensional exploded view of the present invention.
Figure 4:
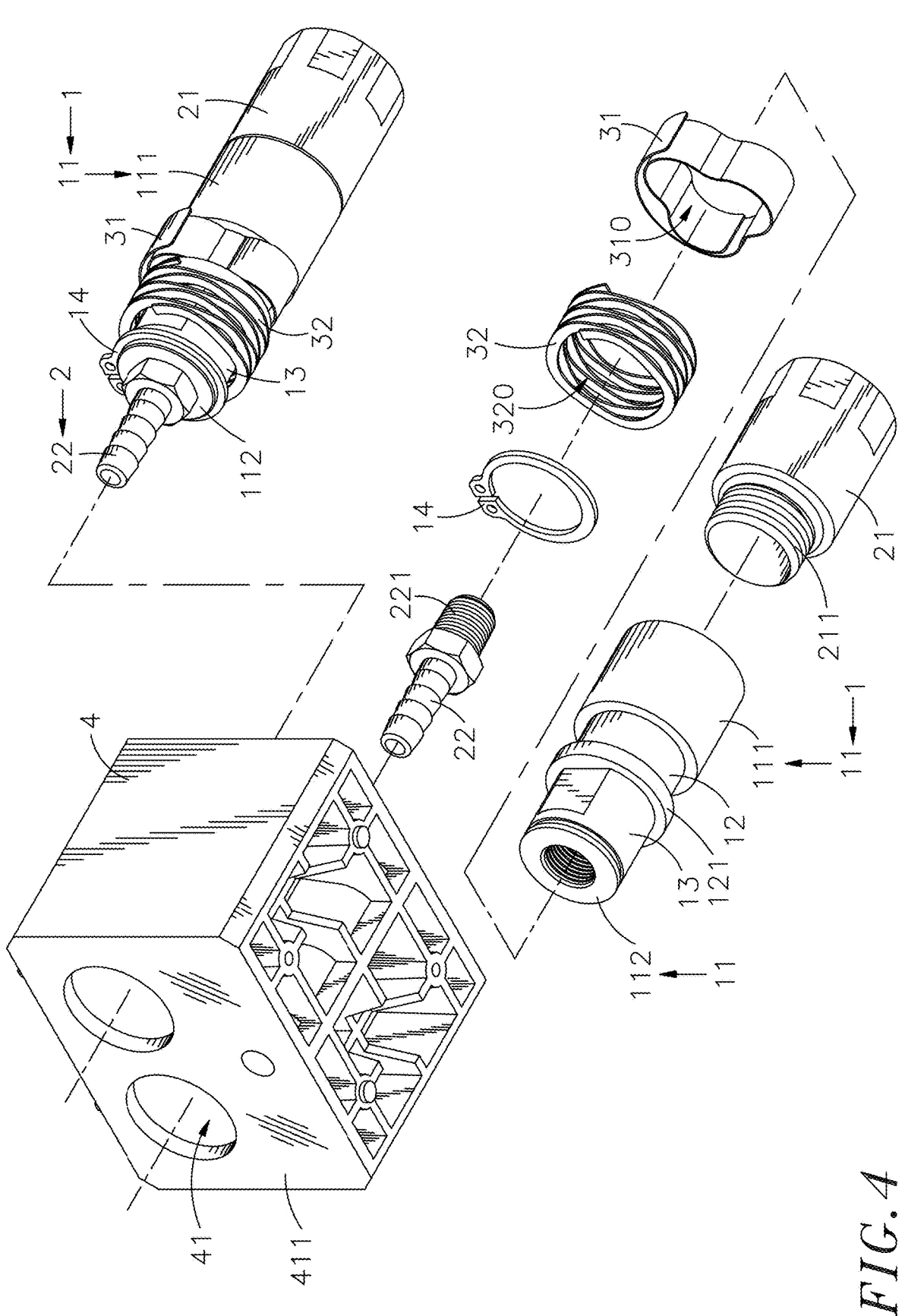
FIG. 4 is a three-dimensional exploded view of the present invention from another viewing angle.

Please refer to FIGS. 1, 2, 3, and 4, which are a three-dimensional external view, a three-dimensional external view from another viewing angle, a three-dimensional exploded view, and a three-dimensional exploded view from another viewing angle of the present invention. As shown in the figures, it can be clearly seen that the floating adapter module of the present invention comprises a base 1, two docking parts 2, a floating unit 3 and a housing 4.

The base 1 comprises a through channel 10 inside, two connecting portions 11 respectively provided on both sides of the channel 10, a receiving groove 12 and a shaft 13 provided adjacent to each other on the outside of the channel 10, a limiter 14 assembled on the shaft 13 opposite to the receiving groove 12, and a protruding spacer ring 121 with a larger outer diameter provided between the receiving groove 12 and the shaft 13.

The two docking parts 2 are respectively assembled at the connecting portions 11 on both sides of the base 1.

The floating unit 3 comprises a first elastic member 31 and a second elastic member 32. The first elastic member 31 is assembled at the receiving groove 12 of the base 1, and the second elastic member 32 is assembled and mounted around the shaft 13.

The housing 4 comprises a receiving space 40 for assembling and positioning the base 1, a through hole 41 with a reduced diameter provided on one side of the receiving space 40, and an inner shoulder 42 formed between the through hole 41 and the receiving space 40 to support one side of the second elastic member 32 on the shaft 13, so that the outer side surface 411 of the housing 4 around the through hole 41 opposite to the inner shoulder 42 can be used for the limiter 14 on one side of the shaft 13 to abut against.

The above-mentioned two connecting portions 11 of the base 1 of the present invention are respectively defined as the first connecting portion 111 and the second connecting portion 112. The two docking parts 2 are respectively defined as the first docking part 21 and the second docking part 22. The first connecting portion 111 and the second connecting portion 112 on both sides of the channel 10 are respectively provided for the first docking part 21 and the second docking part 22 of the two docking parts 2 to assemble. The first docking part 21 and the second docking part 22 are respectively provided with a first docking side 211 assembled at the first connecting portion 111 and a second docking side 221 assembled at the second connecting portion 112. The first connecting portion 111 and the second connecting portion 112 of the connecting portions 11 and the first docking side 211 and the second docking side 221 of the two docking parts 2 may be a screw hole and a screw rod, a quick jack and a quick connector, or a shaft hole and a shaft, etc. for relative assembly of the structure. The outer diameter of the protruding spacer ring 121 of the base 1 can be larger than the outer diameters of the receiving groove 12 and the shaft 13. The limiter 14 assembled on one side of the shaft 13 of the base 1 can be a C-shaped buckle, a gasket or a latch. The first docking part 21 and the second docking part 22 of the two docking parts 2 can respectively be a quick connector, a quick jack, a male plug connector, a female socket connector or a water pipe connector.

Furthermore, the above-mentioned first elastic member 31 of the floating unit 3 of the present invention can be a reed, and can have an assembly hole 310 inside to be assembled and sleeved on the receiving groove 12 of the base 1, and one side of the first elastic member 31 abuts against the protruding spacer ring 121. The reed-shaped first elastic member 31 may be in the form of a ring wave, a ring cloud, a ring tooth, a ring regular or irregular shape, a ring concave-convex shape, or a curved pad. The reed-shaped first elastic member 31 is a radial horizontal (X-axis) left and right direction to form a deformation adjustment space of ±1.5 mm or the vertical (Y-axis) up and down direction to form a deformation adjustment space of ±2.0 mm or the like.

The second elastic member 32 of the floating unit 3 can be a flat rectangular sheet-shaped wound spring, etc., which can be wound into a ring shape in a wavy manner, so that the second elastic member 32 can form an axial (forward and backward) deformation adjustment space of ±2.50 mm, and can form a unidirectional compression displacement deformation adjustment of −4 mm or the like during assembly. The second elastic member 32 can be assembled and sleeved onto the shaft 13 of the base 1 by using the inner fitting hole 320 thereof, so that one side of the second elastic member 32 abuts against the protruding spacer ring 121 and the other side abuts against the inner shoulder 42 on the inside of the receiving space 40 of the housing 4.

Figure 5:
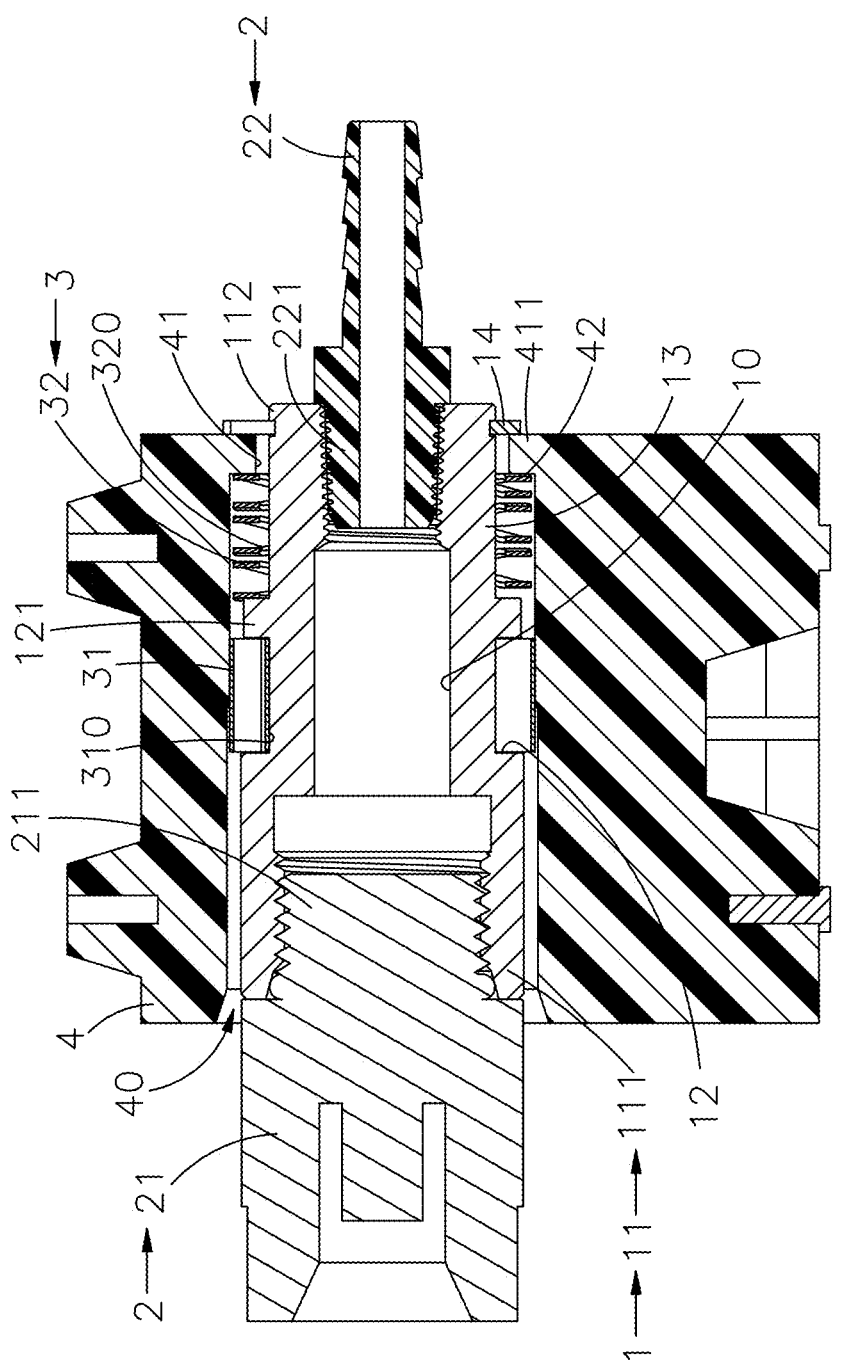
FIG. 5 is a side cross-sectional view of the present invention.
Figure 6:
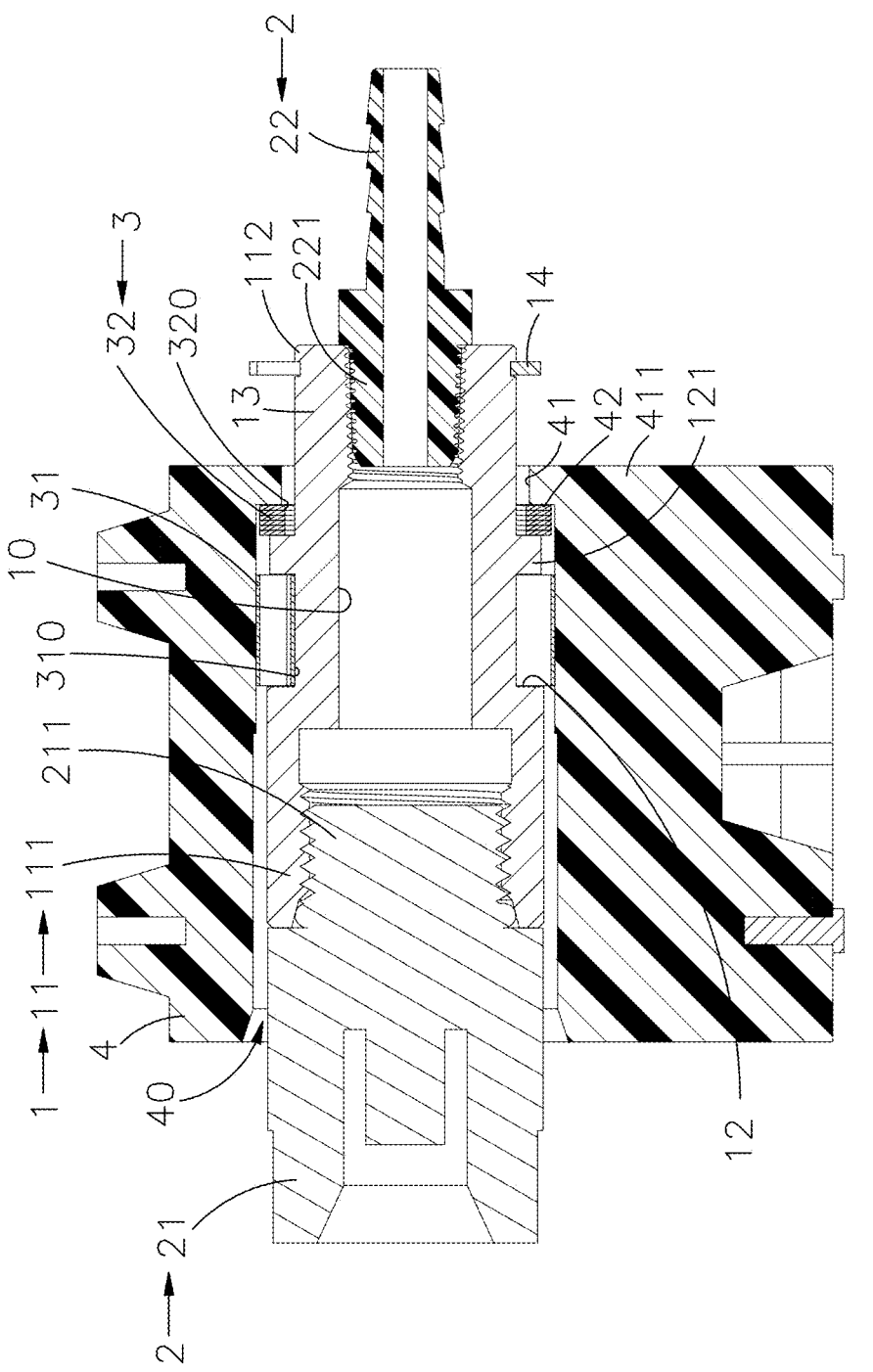
FIG. 6 is a side cross-sectional view of a preferred embodiment of the present invention.
Figure 7:
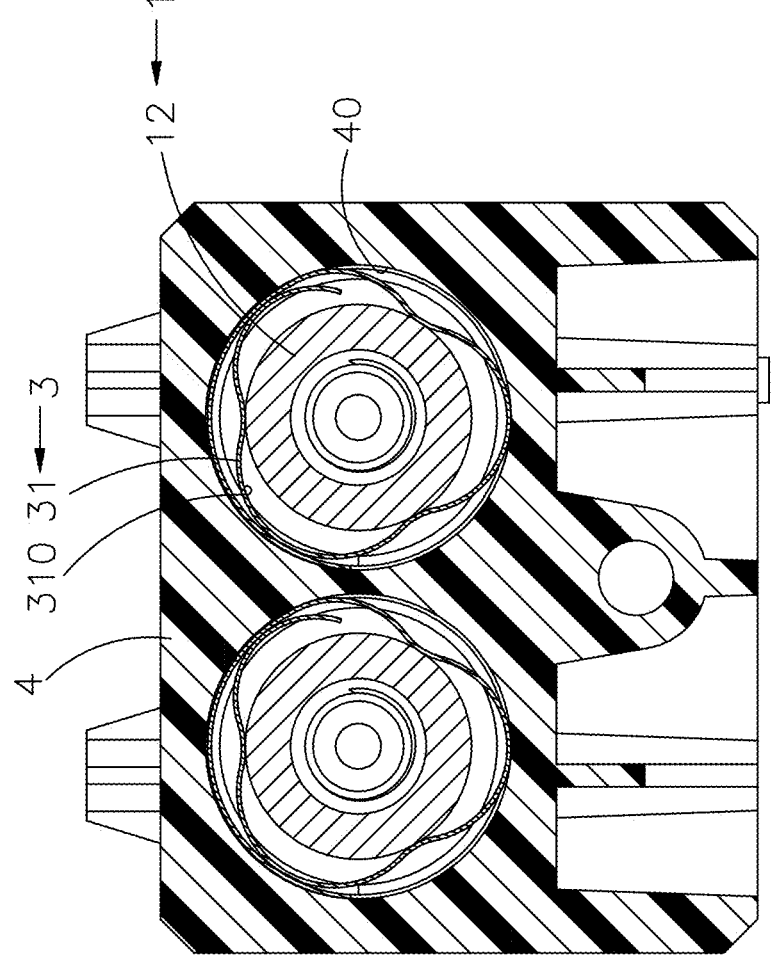
FIG. 7 is a front cross-sectional view of a preferred embodiment of the present invention.
Figure 8:
FIG. 8 is a three-dimensional external view of a preferred embodiment of the present invention.

Please refer to FIGS. 1 to 8, the floating adapter module of the present invention can be applied to a case, a circuit board or a panel (board-to-board) used in an electronic device when they are assembled or to a water-cooling system used as a heat source of the electronic device. It can be installed at an electronic device (e.g., a case, a circuit board, a panel, or a water-cooling system of a heat source) through the housing 4, and then connected to the water pipe of a preset water-cooling system (e.g., a water cooling circulator) through the second docking part 22 of the two docking parts 2 on one side of base 1, and connected to the water pipe of an external preset water-cooling system (e.g., a water supply system, a water tank, or a motor) through the first docking part 21 of the two docking parts 2 on the other side of base 1. When the first docking part 21 and the second docking part 22 on both sides of the base 1 are connected to the preset water pipe, the first elastic member 31 of the floating unit 3 outside the base 1 can be used to form radial adjustment displacement in the left and right, up and down (X, Y) directions, and at the same time, the second elastic member 32 of the floating unit 3 can be used to form an axial adjustment displacement in the front and back (Z) direction, so that when the first docking part 21 and the second docking part 22 on both sides of the base 1 are connected to the external preset water pipe, the purpose of forming a multi-directional floating adjustment displacement and deformation is achieved. The space and distance that can be adjusted by elastic deformation will not be affected by other preset components or equipment around it, making assembly operations more convenient and faster.

The above description is merely a preferred embodiment of the present invention and does not limit the patent scope of the present invention. Therefore, all simple modifications and equivalent structural changes made by using the contents of the description and drawings of the present invention should be included in the patent scope of the present invention and should be declared.

In summary, the floating adapter module of the present invention can achieve its effect and purpose when used. Therefore, this invention is truly an invention with excellent practicality. In order to meet the application requirements for invention patents, an application has been filed in accordance with the law. I hope that the review committee will approve this case as soon as possible to protect the inventor's hard work. If the review committee has any questions, please feel free to write to us for instructions. The inventor will do his best to cooperate and we will be very grateful.

What the invention claimed is:

1. A floating adapter module, comprising a base, two docking parts, a floating unit and a housing, wherein:

said base comprising a through channel inside, two connecting portions respectively provided on two opposite sides of said channel, a receiving groove and a shaft provided adjacent to each other on an outside of said base, and a limiter assembled on said shaft opposite to said receiving groove;

said two docking parts are respectively assembled at said two connecting portions on both sides of said base;

said floating unit comprising a first elastic member assembled at said receiving groove of said base and a second elastic member assembled around said shaft; and said housing comprising a receiving space for assembling and positioning said base, a through hole with a reduced diameter provided on one side of said receiving space, and an inner shoulder formed between said through hole and said receiving space to support one side of said second elastic member on said shaft, so that an outer side surface of said housing around said through hole opposite to said inner shoulder is used for said limiter on one side of said shaft to abut against.

2. The floating adapter module as claimed in claim 1, wherein said two connecting portions on both sides of said channel are respectively defined as a first connecting portion and a second connecting portion; said two docking parts are respectively defined as a first docking part and a second docking part; and said first connecting portion and said second connecting portion on both sides of said channel being respectively provided for said first docking part and said second docking part to assemble, said first docking part being provided with a first docking side assembled at said first connecting portion, said second docking part being provided with a second docking side assembled at said second connecting portion.

3. The floating adapter module as claimed in claim 2, wherein said first connecting portion and said second connecting portion of said two connecting portions and said first docking side and said second docking side of said two docking parts are respectively and selectively a screw hole and a screw rod, a quick jack and a quick connector, or a shaft hole and a shaft.

4. The floating adapter module as claimed in claim 1, wherein said base further comprises a protruding spacer ring with a larger outer diameter provided between said receiving groove and said shaft, said limiter on one side of said shaft being selectively a C-shaped buckle, a gasket or a latch.

5. The floating adapter module as claimed in claim 1, wherein said two docking parts are respectively selected from the group of quick connectors, quick jacks, male plug connectors, female socket connectors and water pipe connectors.

6. The floating adapter module as claimed in claim 1, wherein said first elastic member of said floating unit is a reed having an assembly hole which is assembled and sleeved on said receiving groove of said base therein, and the reed being selectively in the form of a ring wave, a ring cloud, a ring tooth, a ring regular or irregular shape, a ring concave-convex shape, or a curved pad.

7. The floating adapter module as claimed in claim 6, wherein the reed of said first elastic member is selectively a radial horizontal (X-axis) direction to form a deformation adjustment space of $\pm1.5$ mm or a vertical (Y-axis) direction to form a deformation adjustment space of $\pm2.0$ mm.

8. The floating adapter module as claimed in claim 1, wherein said second elastic member of said floating unit is a flat rectangular sheet-shaped wound spring which can be wound into a ring shape.

9. The floating adapter module as claimed in claim 8, wherein said second elastic member forms an axial deformation adjustment space of $\pm2.50$ mm and forms a unidirectional compression displacement deformation adjustment of $-4$ mm during assembly.

* * * * *